UNITED STATES PATENT OFFICE.

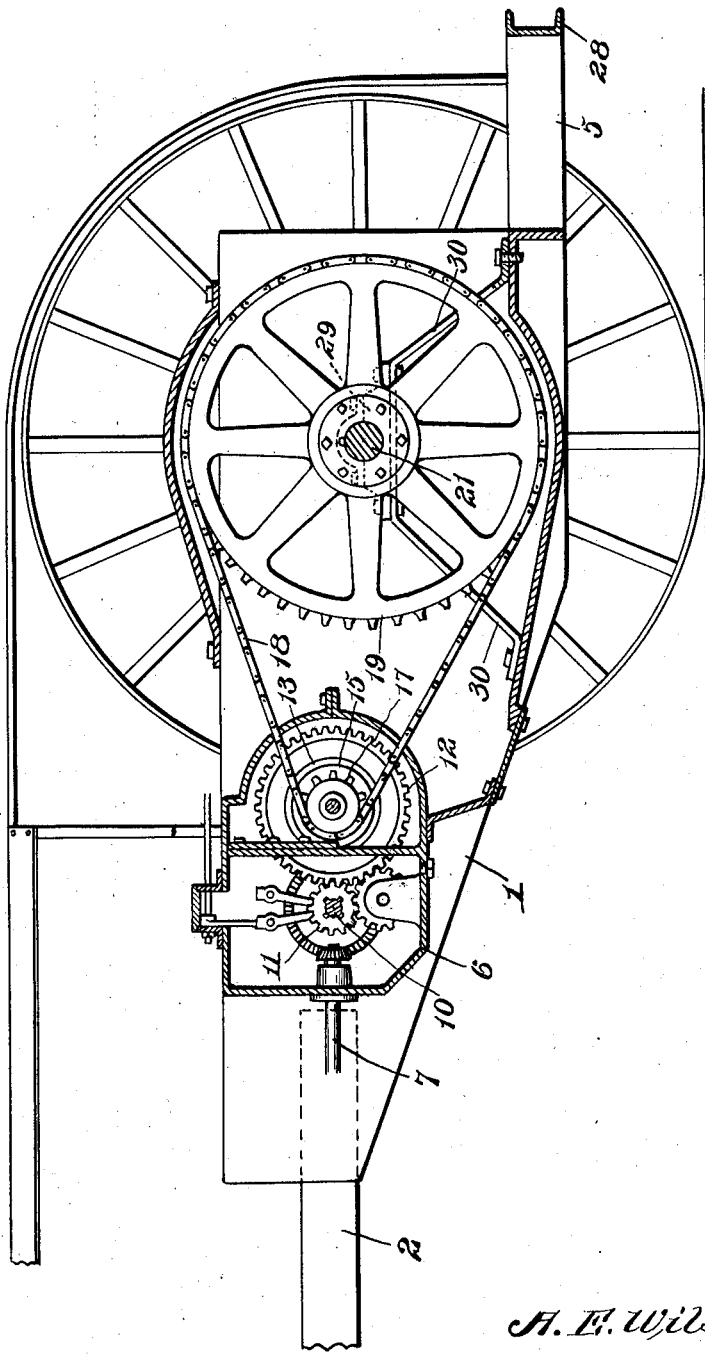

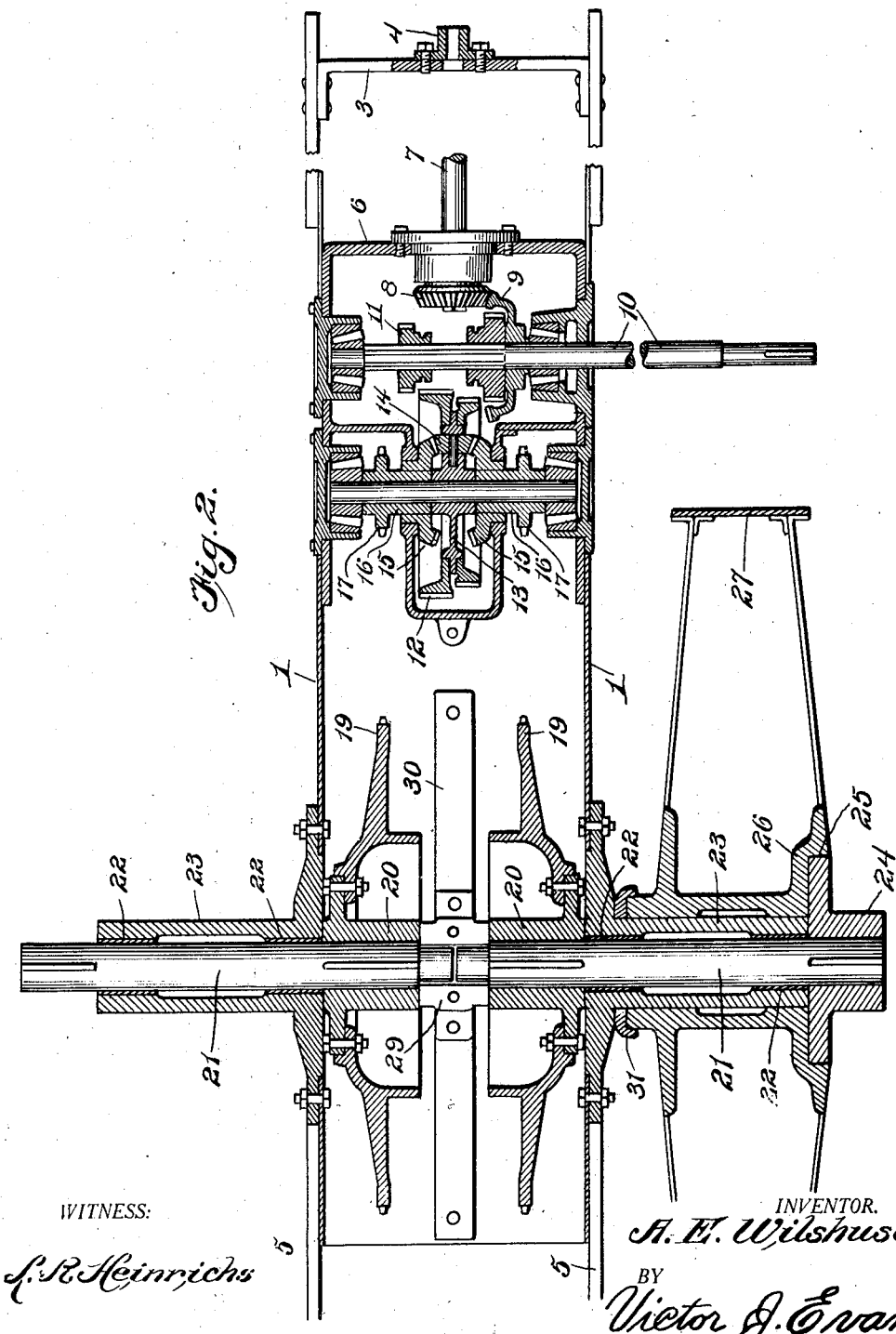

AUGUST ERNEST WILSHUSEN, OF WICHITA, KANSAS.

TRACTOR.

1,362,520. Specification of Letters Patent. Patented Dec. 14, 1920.

Application filed November 21, 1919, Serial No. 339,532. Renewed October 28, 1920. Serial No. 420,320.

*To all whom it may concern:*

Be it known that I, AUGUST ERNEST WILSHUSEN, a citizen of the United States, residing at Wichita, in the county of Sedgwick and State of Kansas, have invented new and useful Improvements in Tractors, of which the following is a specification.

The object of my present sole invention is the provision in a tractor of an improved transmission and rear axle drive in one unit, and in which the transmission and rear axle are maintained in proper relation by sheet-metal side plates.

The invention also contemplates extending channel irons forwardly from the side plates for the support of the motor, and when desired channel bars may also be extended rearwardly from the side plates for the support of a platform.

To the attainment of the foregoing, the invention consists in the improvement as hereinafter described and definitely claimed.

In the accompanying drawings, forming part hereof:

Figure 1 is a view, partly in side elevation and partly in vertical section of a tractor embodying my invention.

Fig. 2 is a detail view, partly in plan and partly in horizontal section, illustrative of my improvement.

Similar numerals of reference designate corresponding parts in both views of the drawings.

Among other elements my improvement comprises parallel upright steel side plates 1, parallel channel bars 2 fixed to and extending forwardly from the side plates 1 and carrying a transverse bracket 3 on which is a casting 4 designed to constitute a bearing for a starting crank, and channel bars 5 extending rearwardly from the side plates 1, and designed to support a platform (not shown).

Interposed between and fixed to the parallel side plates 1 is a gear frame 6, and journaled in said gear frame is a longitudinal clutch shaft 7, carrying a first drive pinion 8. Said drive pinion 8 is intermeshed with a beveled gear 9, and said gear 9 is keyed to a sliding shaft 10, designed to carry a belt wheel (not shown), and equipped with a gear 11, splined on the shaft. The said gear 11 is designed to be intermeshed with an annular gear 12, carried by a differential spider 13 on which are pinions 14, intermeshed with beveled gears 15. The said gears 15 are keyed to the hubs 16 of sprockets 17. As will be readily apparent, the train described constitutes the first low speed drive, and it will also be understood that through sprocket belts 18 power will be transmitted from the sprocket gears 17 to sprocket gears 19 rotatable with the rear or traction wheels. The said sprocket gears 19 are bolted to hubs 20, and the said hubs are keyed to drive shafts 21 which are disposed in bronze sleeves 22 held in the tubular spindles 23 which are bolted to the side plates 1 as shown. Fixed on the outer ends of the shafts 21 to turn therewith are hub sections 24 which are locked in recesses 25 in the outer sides of the hubs 26 of the traction wheels 27. It will be manifest that because of the tubular spindles 23 being bolted to the plates 1 as described, a complete unit and transmission, as well as a strong frame structure is produced, and both members of the unit are disposed between the gears and the sprockets.

At their rear ends the channel bars 5 are fixedly connected to a transverse channel bar 28.

Receiving the inner end portions of the drive shafts 21 is a central journal 29 that is carried by a bracket 30, fixed with respect to the side plates 1.

Dust bands 31 are preferably interposed between the inner ends of the wheel hubs and the flanges of the spindle sections 23, as illustrated.

Having described my invention, what I claim and desire to secure by Letters-Patent, is:

In a tractor, the combination of longitudinal, vertical spaced side plates, tubular spindles having flanges lapped against and bolted to said plates, said spindles extending outwardly from said plates, shafts journaled in said spindles, ground wheels rotatable about the spindles, said wheels having recesses in their outer sides, hub sections locked in said recesses and fixed to the shafts, sprocket gears fixed to the shafts and arranged between the spindle flanges and also between the plates, a longitudinal shaft carried by and arranged between the said side plates, sprocket gears carried by and between the side plates, sprocket belts connecting the first-named sprocket gears and the second-named sprocket gears, a journal fixed between the plates and receiving the inner ends of the first-named shafts, a drive shaft carried by and between the side plates, transmission means carried by and between the side plates and interposed between the side plates and also interposed between and connecting the second-named sprocket gears and the drive shafts, bars fixed to and extending forwardly from the plates, and bars fixed to and extending rearwardly from the plates.

In testimony whereof I affix my signature.

AUGUST ERNEST WILSHUSEN.